J. M. MONESS.
METHOD OF MAKING CHLORINATED PRODUCTS.
APPLICATION FILED FEB. 8, 1917.
1,308,763.
Patented July 8, 1919.
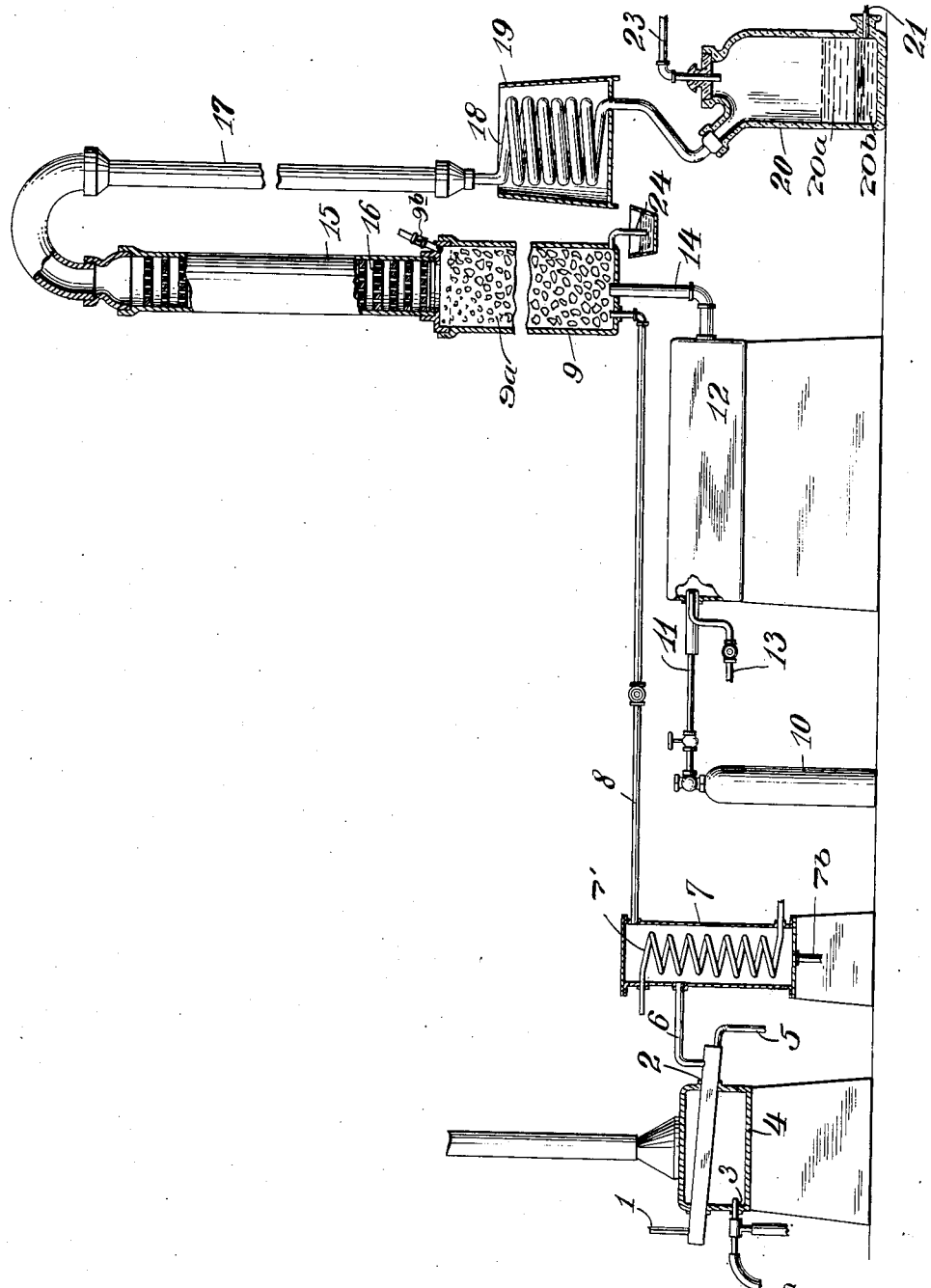
Inventor
J. M Moness
By his Attorney
K. P. McElroy

UNITED STATES PATENT OFFICE.

JACOB M. MONESS, OF LONG ISLAND CITY, NEW YORK, ASSIGNOR TO CHEMICAL DEVELOPMENT COMPANY, A CORPORATION OF MAINE.

METHOD OF MAKING CHLORINATED PRODUCTS.

1,308,763.      Specification of Letters Patent.      Patented July 8, 1919.

Application filed February 8, 1917. Serial No. 147,466.

*To all whom it may concern:*

Be it known that I, JACOB M. MONESS, a subject of the Czar of Russia, residing at Long Island City, in the county of Queens and State of New York, have invented certain new and useful Improvements in Methods of Making Chlorinated Products, of which the following is a specification.

This invention relates to methods of making chlorinated products; and it comprises a method of making chlorinated products from oil and like gases containing olefins wherein such gas is brought into contact with chlorin in the presence of steam and an oxid capable of neutralizing hydrochloric acid and of oxidizing the same, such as manganese dioxid; all as more fully hereinafter set forth and as claimed.

On bringing together gaseous unsaturated hydrocarbons of the olefin series (ethylene, propylene and the butylenes) and chlorin in the presence of steam, there are two main reactions. One reaction is the production of what are known as the olefin chlorids. Ethylene gives ethylene chlorid, $C_2H_4Cl_2$ (Dutch liquid), and propylene and the butylenes give, respectively, propylene chlorid and the butylene chlorids. The other main reaction which may take place in the presence of steam is the formation of bodies of quite another class, the chlorhydrins. Ethylene gives ethylene chlorhydrin, $C_2H_4OHCl$ and propylene and the butylenes the corresponding chlorhydrins. In so doing, half the chlorin reappears in the chlorhydrin while half reappears as hydrochloric acid formed at the expense of the water vapor. In forming the olefin chlorids all the chlorin reappears in the product. It is practically desirable in performing a reaction of this kind to restrict the amount of dichlorids formed and increase the amount of chlorhydrins. The greater the amount of hydrochloric acid (HCl) in the sphere of reaction, the greater is the tendency toward the formation of chlorids rather than chlorhydrins. In the present invention I use special means in the reaction chamber for removing the HCl as it is formed. In so doing, I accomplish the desirable result of favoring the production of chlorhydrins at the expense of the chlorids.

While my invention is applicable to gaseous olefins from other sources, I shall hereinafter more particularly describe it with regard to the treatment of oil gas made by gasifying petroleum oils and products, such as gas oil, solar oil, kerosene, wax tailings, crude petroleum, etc. Any of these oils passed through a heated zone maintained at about 700° C. will produce a gas rich in the unsaturated gaseous hydrocarbons of the olefin series. A good oil gas can be made giving 50 per cent. total unsaturated gases (bromin absorption). In making the gas, it is advisable to feed the oil to the gasifying retort or the like at a rather more rapid rate than it is gasified, so that an excess of oil passes through, and to quickly cool the issuing gas. Under these conditions the condensing oils condense out as a fog which scrubs the gas effect ally, removing gasolene vapors, etc. The gas may be purified in any of the usual ways.

Oil gas so made may be passed into any suitable reaction chamber together with chlorin and steam, the whole reaction chamber being maintained at a suitable temperature to keep the chlorids and chlorhydrins produced in the state of vapor, say, at 97–100° C. These vapors are subsequently condensed and recovered.

In the present invention I supply to the reaction chamber basic material capable of reacting with the HCl formed as an incident to the chlorhydrin reaction, thereby removing its retarding influence on such reaction. This material may be merely a basic oxid such as magnesia, zinc oxid, etc., or it may also exercise oxidizing functions as in the case of chromates, manganese dioxid, ferric oxid, etc. Carbonates such as calcium carbonate, etc., are less desirable as furnishing $CO_2$ to dilute the gases. The active material may be sent through the reaction zone as a suspension or solution, as in sending a suspension of "Weldon mud" through the reaction zone in counter current to the gases and vapors; or it may be used in granulated form; a mass of granulated material being maintained within the reaction chamber.

I find manganese dioxid, or "Weldon mud" is best adapted for the present purposes since it enables recovery and utilization of part of the chlorin of the HCl to take part again in the reaction.

In reacting upon manganese dioxid with HCl, part of the HCl is neutralized to form manganese chlorid and part is oxidized to form free chlorin. The dioxid therefore has both a neutralizing and an oxidizing function.

I find in practice that the presence of manganese dioxid in the reaction chamber materially facilitates the chlorhydrin forming reaction and increases the yield and I do not intend to express an opinion that its only useful function is the stated action of neutralizing part of the HCl and oxidizing the rest to form chlorin.

I generally employ the manganese dioxid in granular form in the reaction chamber. The manganese chlorid produced drains away as a water solution. The supply of manganese binoxid is replenished from time to time.

After completion of the reaction the mixture of gases and vapors is composed of steam, the gases of the original oil gas which have not entered into reaction; vapors of chlorhydrins, vapors of chlorids, etc. On passing the mixture through a condenser, the vapors are condensed to give an aqueous solution of chlorhydrin with an oily separation of whatever olefin chlorids may have been formed. The olefin chlorids may be washed to free them of dissolved chlorhydrins and marketed for solvent purposes. It is ordinarily best to fractionate the mixed chlorids to obtain ethylene chlorid, propylene chlorid and the like as separate materials. The aqueous solution of chlorhydrin may be redistilled to recover the chlorhydrins. On distillation the chlorhydrins come over with the first portions of the distillate; and with care in distillation separate from the first condensate as an immiscible oily layer. This oily layer may be dried with salt and rectified to obtain the dry chlorhydrins. The dry chlorhydrins may be sold for solvent purposes or may be converted into other products, such as glycols. The watery solution of chlorhydrins separated from the oily layer and subsequent weaker solutions coming over in the rectification may be redistilled to obtain more chlorhydrins in well understood ways. The uncondensed gases passing the condenser will be found to be nearly free of hydrochloric acid or chlorids and may be used for light, power or fuel purposes.

In the accompanying illustration I have shown, more or less diagrammatically, suitable apparatus, partly in vertical section and partly in elevation, for use in the present process.

In this showing element 1 is an oil feed leading to retort 2 which may be of iron or any other suitable material. Heat is supplied by oil or gas burner 3 in heating chamber 4. Oil drip 5 is provided to take care of unvaporized oil. Oil gas passes from the retort through 6 into settling chamber 7, where it may be cooled or chilled by water pipe 7'. Condensed oil is removed at 7$^b$. The clarified gas passes through valved pipe 8 into reaction chamber 9 shown as packed with granular manganese binoxid 9$^a$. Into this chamber is also led a mixture of chlorin and steam or their reaction products, chlorin being supplied from any suitable source 10, such as the chlorin cylinder shown. The chlorin passes through pipe 11 into mixing chamber 12, where it is met by steam from 13. The mixture of steam, chlorin and reaction products passes through 14 into the described reaction chamber. In this chamber the described chlorhydrin forming reaction takes place. The mixture of gas and vapors passes upward through column 15, shown as provided with perforated cross plates 16. In this column, which acts as a reflux condenser, a portion of the water is condensed and returned to the reaction chamber. It serves to wash away the manganese chlorid formed by the reaction of HCl with $MnO_2$. The uncondensed vapors and gases pass through 17 to worm 18 in tub 19 where the vapors are condensed. The condensate is received in bottle 20 and usually separates as shown into an upper aqueous layer 20$^a$ and a lower heavy oily layer 20$^b$. The liquid from time to time is removed at 21. Gases pass away through outlet 23. Manganese chlorid solution is removed at 24.

In operating the above apparatus, I find it better to supply the oil gas and chlorin in such relative proportions that the gas finally escaping at 23 shall still contain between 10 and 15 per cent. of unsaturated hydrocarbons.

The manganese chlorid solution may be regenerated by any suitable process, such as the Weldon process and reused. The manganese peroxid used in the reaction chamber 9 may be advantageously used in the form of fragments about the size of chestnuts.

I find that by the use of manganese dioxid in the reaction chamber in the manner described I can obtain a much larger ratio of chlorhydrins to olefin chlorids, as well as more chlorhydrins, other things being equal, than I can in the same chamber without the manganese dioxid.

The granular mass 9$^a$ of manganese dioxid shown not only has the stated chemical functions, but in addition has the purely physical function of promoting admixture of gases and vapors and giving a good scrubbing action as well. These physical functions may be given by other granular, more or less inert, materials such as broken stone, earthenware, etc., and in the event that the manganese dioxid is not employed in granular form such materials may form mass 9$^a$. For example, in using regenerated manganese, ("Weldon mud") 9$^a$ may consist of broken quartz or the like and a suspension of the peroxidized recovered manganese allowed to trickle through from inlet 9<sup>b</sup>.

Instead of using chlorin in the present process, hydrochloric acid solution, which may be weak, may be supplied through 11, the rest of the process being much as that described. The manganese dioxid forms chlorin, so to speak, *in situ*.

Any other basic or oxidizing material desired for use in the reaction, such as lead oxid, ferric oxid, etc., may be supplied through 9<sup>b</sup>.

In using manganese oxid and chlorin, the process of the present invention may be extended to the production of substitution products from saturated hydrocarbons, such as methane. Substitution reactions involve the production of HCl. Methane for example chlorinates to form various chlorids with production of HCl. By maintaining manganese dioxid in the reaction chamber this HCl may be utilized, and the ill effects of its presence obviated, in the described manner.

Instead of using oil gas in the present invention other olefin-rich gases may be used, such as gas from coal coked at low temperatures. Or the olefins, ethylene, propylene and the butylenes may be separately used; pure ethylene from alcohol being treated in the manner described for oil gas, for example.

What I claim is:—

1. In reacting upon hydrocarbon gases with chlorin, the process which comprises contacting such a gas with steam and chlorin in the presence of manganese dioxid.

2. In the manufacture of chlorhydrins, the process which comprises admixing oil gas, chlorin and steam in the presence of a basic material capable of reacting with HCl.

3. In the manufacture of chlorhydrins, the process which comprises admixing oil gas, chlorin and steam in the presence of manganese dioxid.

4. In the manufacture of chlorhydrins, the process which comprises establishing and maintaining a mass of granular manganese dioxid in a suitable reaction chamber, and passing oil gas, chlorin and steam into and through such mass.

5. In the manufacture of chlorhydrins, the process which comprises mixing chlorin and steam and bringing the mixture into reaction with oil gas in a chamber containing manganese dioxid.

6. In the manufacture of chlorhydrins, the process which comprises admixing oil gas, chlorin and steam in the presence of a material capable of reacting with HCl.

7. In the manufacture of chlorhydrins, the process which comprises mixing chlorin and steam and bringing the mixture into reaction with oil gas in a chamber containing material of an oxidizing nature.

In testimony whereof, I affix my signature.

JACOB M. MONESS.

Witnesses:
   Byran E. Eldred,
   Paul R. Heyl.